Aug. 10, 1926.
W. J. FRANCKE
1,595,864
FLEXIBLE COUPLING
Filed Jan. 10, 1922
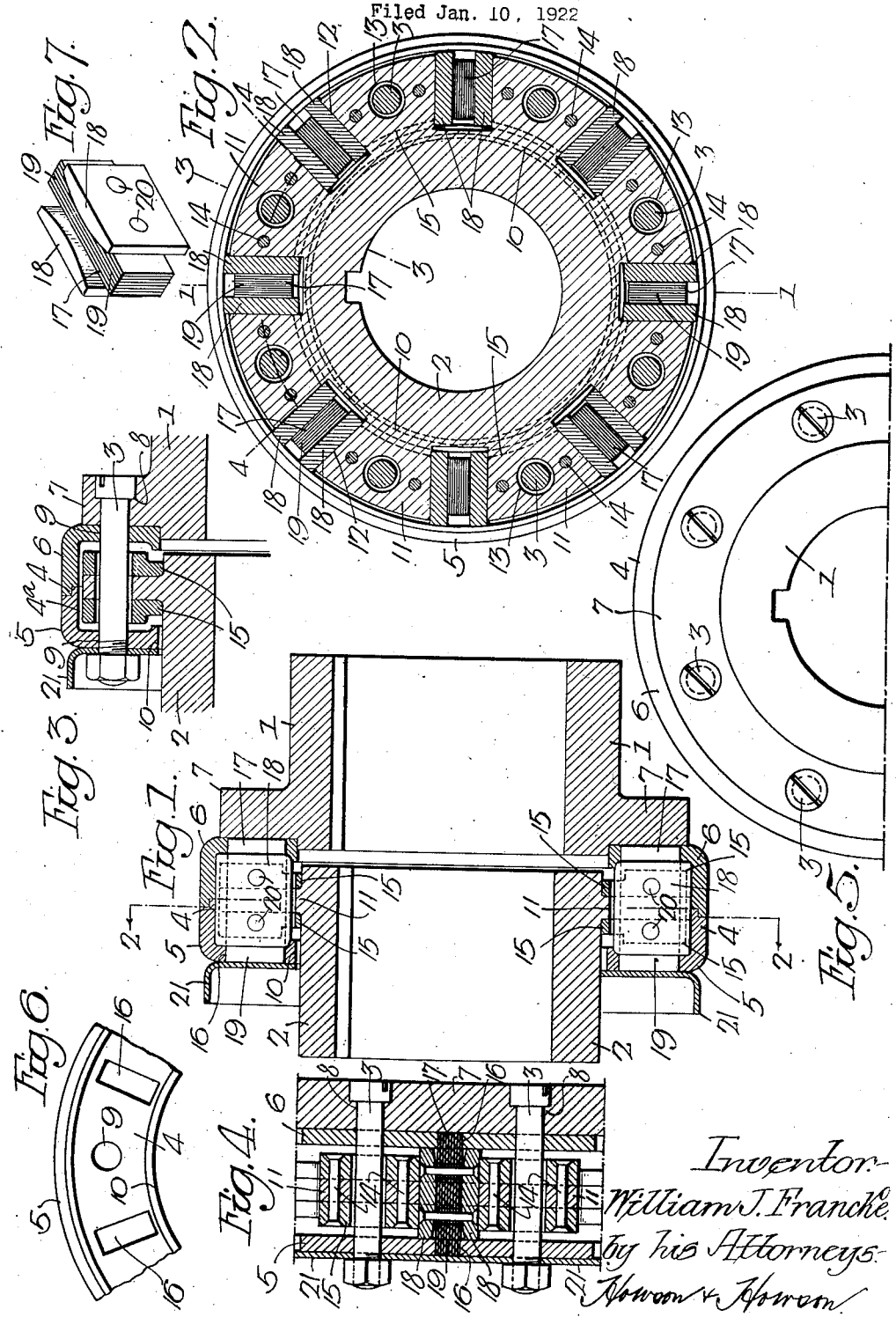
Inventor.
William J. Francke
by his Attorneys
Howson & Howson Patented Aug. 10, 1926.

1,595,864

UNITED STATES PATENT OFFICE.

WILLIAM J. FRANCKE, OF HIGHLAND PARK, NEW JERSEY, ASSIGNOR, BY MESNE ASSIGNMENTS, TO JOHN WALDRON CORPORATION, OF NEW BRUNSWICK, NEW JERSEY, A CORPORATION OF NEW JERSEY.

FLEXIBLE COUPLING.

Application filed January 10, 1922. Serial No. 528,315.

This invention relates to flexible couplings, the object of the invention being to provide a coupling having certain novel and improving features of construction hereinafter clearly set forth.

In the attached drawings:

Figure 1, is a longitudinal section through the coupling on the line 1—1, Fig. 2;

Fig. 2, is a section on the line 2—2, Fig. 1;

Fig. 3, is a fragmentary section on the line 3—3, Fig. 2;

Fig. 4, is a fragmentary section on the line 4—4, Fig. 2;

Fig. 5, is a fragmentary face view of one of the couplings;

Fig. 6, is a fragmentary face view of one of the keeper rings, and

Fig. 7, is a view in perspective of one of the keeper pins.

With reference to the drawings, the coupling comprises a pair of hub elements 1 and 2 which are adapted to be keyed or otherwise attached to the ends of the respective coupled shafts (not shown).

The hub element 1, as best illustrated in Figs. 1, 3 and 5, has secured to the forward face thereof by means of bolts 3, a cylinder 4, composed in the present instance of a pair of substantially cup-shaped rings 5 and 6, respectively male and female, which fit together at their edges to form the cylinder. The hub element 1, as shown in Fig. 5, is provided with a flange 7, in which are formed a series of spaced holes 8 for the reception of the bolts 3, the rings 5 and 6 being similarly apertured at 9, 9, for the passage therethrough of the said bolts whereby the said rings are secured together and to the hub element.

As clearly shown in Fig. 1, the hub element 2 extends through the central opening 10 of the ring 5 and has a flange 11 which occupies the interior, annular recess or chamber 4ᵃ of the cylinder 4. As best shown in Fig. 2, the flange 11 is provided with an evenly spaced series of rectangular radial recesses 12, 12, and also, intermediate of the said recesses, with a series of openings 13 through which the bolts 3 extend, said openings 13, as clearly illustrated, being somewhat larger in diameter than the diameter of the bolt. In the present instance, the flange 11 has, one at each side thereof, a facing ring 15, which may be renewed in case of wear, said segments lying between the recesses 12 and being secured to the flange by means of bolts or rivets 14, 14. The rings 15 are apertured in accordance with the flange for the passage therethrough of the bolt 3. As shown in Fig. 6, the rings 5 and 6 are provided with rectangular openings 16, 16, which correspond in position with the rectangular recesses 12 of the hub element 2.

Disposed within each of the said recesses 12 is a flat keeper pin 17, best shown in Fig. 7, comprising a pair of side elements 18, 18, having flat outer faces, and inner faces convexed on the arc of a circle, said side elements having confined therebetween a set of flat rectangular springs 19 or similar resilient elements, the said springs being held in place between the side elements, and the latter being secured together by means of suitable securing means such as rivets 20, 20. The resilient elements 19 constitute a rectangular laminated body, the ends of which extend beyond the ends of the side elements 18 and project into the rectangular openings 16 of the male and female rings 5 and 6.

As best illustrated in Figs. 1, 2 and 4, the side elements 18 and the projecting ends of the resilient body 19 are so formed as to fit neatly within the annular space formed between the rings 5 and 6 and the said apertures 16, 16. It will also be noted that whereas the pins fit neatly between the sides of the recesses 12, the latter are sufficiently deep to permit a limited relative movement in the radial direction between the pins and the element 2, such movement being further provided for by clearance provided between the periphery of the flange 11 and the inside of the cylinder 4. Clearance is also provided between the sides of the recess 4ᵃ and the facing segments 15, 15, as best shown in Fig. 3.

As will be apparent, the divided nature of the cylinder 4 permits assembling the coupling and the mounting in the interior of the said cylinder of the flange 11 of the hub 2. A cup-shaped washer 21 is preferably secured at the outer face of the ring element 5, as shown in Figs. 1 and 3.

The operation of the coupling will be apparent to those familiar with the art,

Slight angular and parallel misalinements of the axes of the respective coupled shafts are compensated by reason of the flexure of the body 19 and the arcuate inner faces of the side elements 18, 18, of the keeper pins, and by the various clearances permitting relative movement between the element 2 and those members fixed to the element 1.

It will be apparent that considerable modification in detail and general form is permissible with no departure from the essential features of the invention.

I claim:

1. A flexible coupling comprising two elements adapted respectively to be secured to the adjacent ends of two shafts, one of said elements having an annular recess and the other element a corresponding flange extending into said recess, said flange and the side walls of the recess having openings, a flexible member having its ends established in the openings in the said side walls and extending through the openings in said flange, and bolts extending through said flange and through the side walls of said recess and constituting means for limiting the extent of the flexure to which the flexible elements may be subjected.

2. A flexible coupling comprising two elements adapted respectively to be secured to the adjacent ends of two shafts, one of said elements having an annular recess with apertures in the side walls thereof and the other element having a correspondingly apertured flange extending into said recess, and keeper elements comprising a rigid body portion mounted in the apertures of said flange with resilient elements secured to and extending from said rigid body into the apertures in said side walls.

3. A flexible coupling comprising two elements adapted respectively to be secured to the adjacent ends of two shafts, one of said elements having an annular recess and the other element having a corresponding flange extending into said recess, said flange and the opposite sides of said recess having openings therein, flexible elements having their ends fixed in the openings in said side walls and extending through the openings in said flange, and members mounted in said latter openings and presenting curved surfaces to the said flexible elements.

4. A flexible coupling comprising two elements adapted respectively to be secured to the adjacent ends of two shafts, a cylindrical member having an annular recess, bolts securing the member to one of said elements and extending through said recess, a flange on the other of said elements established within said recess and having apertures for passage of said bolts through the flange, and flexible elements connecting the flange with the opposite side walls of said recess.

5. A flexible coupling comprising two elements adapted respectively to be secured to the adjacent ends of two shafts, a cylindrical member secured to one of said elements and having an annular recess, a flange on the other of said elements established within said recess, facing elements secured to the opposite sides of said flange, and flexible elements connecting the flange with the walls of the cylindrical member.

WILLIAM J. FRANCKE.